Aug. 27, 1963     H. M. HARMER     3,102,220
SECONDARY BATTERY CATALYST DEVICE WITH
TEMPERATURE RESPONSIVE MEANS
Filed Nov. 16, 1960
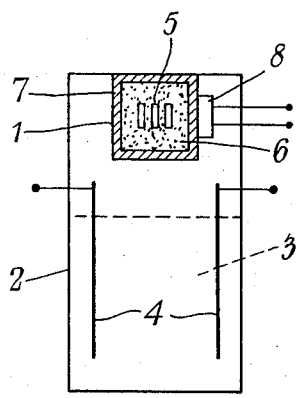
FIG.I.
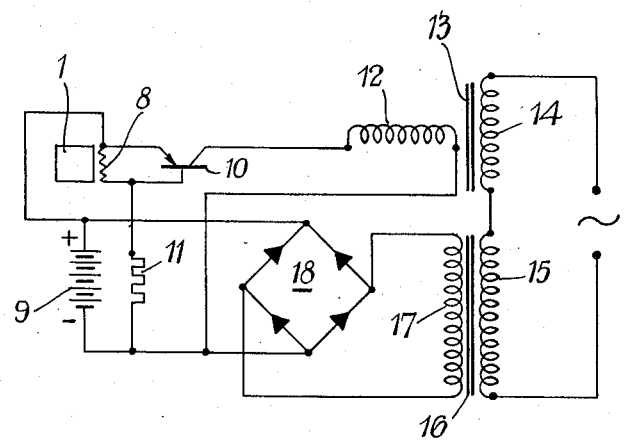
FIG.2.
Inventor
Harold Martin Harmer
by Sommers + Young
Attorneys 3,102,220
SECONDARY BATTERY CATALYST DEVICE WITH TEMPERATURE RESPONSIVE MEANS
Harold Martin Harmer, Brentwood, England, assignor to Miranda Corporation, New York, N.Y., a corporation of New Mexico
Filed Nov. 16, 1960, Ser. No. 69,636
Claims priority, application Great Britain Nov. 18, 1959
10 Claims. (Cl. 320—36)

This invention concerns improvements relating to secondary, electrolytic or like cells embodying a catalyst with the assistance of which hydrogen and oxygen, produced by electrolysis when the cell has a current flowing through it, for charging or discharging it or for producing a voltage across it, are converted into water, which is returned to the electrolyte. Catalytic devices for the purpose set forth are described, for example, in the specification of United States Patent No. 2,687,448.

Such a catalytic device permits the cell to be hermetically sealed and, if used in conjunction with means for suitably regulating the current, say for producing float-charging conditions, the sealed cell or a battery of such cells requires no attention and can be housed or incorporated in other apparatus without risk of corrosion of the latter or of danger from explosive concentrations of hydrogen.

It has been found that, when such a catalytic device is used, the temperature rise of the catalyst is a measure of the rate of conversion into water of the $H_2O$ gases formed. In accordance with the invention, provision is accordingly made for regulating or controlling the current through the cell in dependence upon temperature rise of the catalyst.

According to the invention, therefore, use is made, in combination with a secondary or electrolytic cell provided with a catalyst device for the purpose set forth, of means for passing a charging or electrolysing current through the said cell, and means responsive to temperature rise of the said catalyst device due to its catalytic action and operative for controlling the said current in dependence upon the said temperature rise. The apparatus may comprise an electrical temperature-responsive device disposed in contact with or close to the catalyst device and regulating means connected to the said temperature-responsive device and arranged to regulate the said current. In the case of a battery of cells, one or more or all cells of the battery may be provided with a catalyst device and temperature-responsive device.

The temperature rise of the catalyst device may be determined by reference to the resistance, varying with temperature, of the catalyst material itself or to the resistance of a resistor which has a large temperature coefficient of resistance and which is disposed near to the catalyst device. Alternatively, the temperature rise may be determined by means of a thermocouple similarly disposed.

One manner of carrying the invention into effect will now be more fully described by way of example and with reference to the accompanying drawing, in which:

FIGURE 1 is a diagrammatic vertical section through a secondary cell, and

FIGURE 2 is a charging-circuit diagram.

As illustrated in FIGURE 1, a catalyst device 1 of the kind referred to above is secured in the upper part of the cell 2 in the space above the electrolyte 3 and plates 4, where it will be contacted by the gaseous products of electrolysis in the cell. As illustrated, the cell is completely sealed, but this is not essential and the invention can also be applied to an unsealed cell. The catalyst device comprises catalyst bodies 5 carried in a layer 6 of filtering or hydroscopic material and enclosed within a protective capsule 7 which is non-porous to liquids but permeable to gases and vapours. The catalyst device may in essentials be such as has been described in the aforesaid specification. A resistor 8 having a high temperature coefficient of resistance, either positive or negative, is attached to and in contact with the catalyst device, so that its temperature will vary closely with variation of temperature of the catalyst device and the value of its resistance will vary with the condition of heat development in the said device. Such a catalyst device may be provided in a single cell or in one or more of the cells of a battery.

In the circuit diagram of FIGURE 2, it will be assumed that the catalyst device 1 and resistor 8 are in one cell of a battery 9 and that the said resistor is a so-called "thermistor" having a large negative temperature coefficient of resistance. The resistor 8 is connected, in parallel with the emitter-base connections of a transistor 10, in series with the battery 9 and a resistor 11 in the form of a barretter or lamp device which takes a substantially constant current. The emitter-collector collections of the transistor are in series with the battery 9 and the control winding 12 of a transductor 13. The A.C. winding 14 of the transductor is connected to an A.C. source in series with the primary winding 15 of a transformer 16. The secondary winding 17 of the transformer is connected across the battery 9 through a bridge rectifier 18.

The manner of operation of the above-described apparatus is as follows:

A charging current is supplied to the battery 9 from the A.C. source through the transformer 16 and rectifier 18. If the rate of conversion to water vapour of the gaseous products of electrolysis in the cell 2 by the catalyst device 1 is low, so that the temperature of the said device and the resistor 8 is also low, the resistance of the latter will be high and a relatively high proportion of the current through the barretter 11 will flow through the emitter-base circuit of the transistor 10. An amplified current will flow in the collector circuit of the said transistor and through the control winding 12 of the transductor 13. This current from the transistor 10 will tend to saturate the transductor, reducing its impedance and permitting the flow through the primary winding 15 of the transformer 16 of an alternating current having a value appropriate for supplying a normal charging current to the battery 9 by way of the rectifier 18.

If, however, the rate of conversion of the products of electrolysis in the cell 2 is high, as it will be towards the end of a charging operation, the temperature of the catalyst device 1 and resistor 8 will be high and the resistance of the said resistor low. A smaller proportion of the current through the barretter 11 will flow through the emitter circuit of the transistor 10 and a reduced current, or substantially no current, will flow in the collector-base circuit through the control winding 12 of the transductor 13. The increased impedance of the transductor will accordingly result in a reduced current being supplied to the battery 9 by way of the transformer 16 and rectifier 18 or can be arranged to terminate the supply of current, for example when a battery is fully charged.

The maximum current supplied to the battery 9 through the rectifier 18 is a direct function of the maximum current passed by the barretter 11 when the resistor 8 is at its minimum temperature and the collector current of the resistor 10 flowing in the transductor winding 12 is a maximum. A variable resistance provided in series with the barretter 11 may be adjusted to vary the value of the current supplied to the battery 9 when the resistor 8 is at its minimum temperature and so adjust the initial value of the current supplied to the battery.

If a thermocouple element is used as temperature-responsive device, it may be disposed in place of the resistor 8 in contact with the catalyst device 1. The voltage generated in the element can then again be used to provide, by way of an amplifying device, a control signal for a transductor or other charging-current regulator.

According to another manner of carrying the invention into effect, the temperature rise in the catalyst is compared with the temperature rise of a resistor in the external circuit for the current through the cell. It is then possible to relate these temperatures to the proportions in which the said current is divided between current which is charging the cell and current which is electrolysing the water content of the electrolyte. In dependence upon the comparison of the temperatures, an automatic regulating effect can be produced whereby, say, the charging current can be caused to follow an efficient law with minimum loss of current for electrolysis, or without a maximum rate of electrolysis being exceeded, or to be automatically terminated when the cell is fully charged, i.e. when the whole of the current passing into the cell is merely producing electrolysis and supplying the known losses therein. The temperature comparison may be effected by means of a bridge circuit having thermistors influenced by the temperature of the catalyst and external resistor respectively in two of its arms. The out-of-balance current or absence of such current is then utilised to produce the regulating or charge-terminating effects referred to above.

As a further alternative, the temperature rise of the catalyst may be arranged to control by itself the charging current or current through the cell.

For an existing cell, the catalyst device may be made up, together with the temperature-responsive device, in the form of a cartridge plug or other unit to be arranged on or in, or in proximity to, the cell. In the case of a new cell, the unit may be embodied in or on the cell.

I claim:

1. In an apparatus for controlling the charging current supplied to wet electrical storage cell means and responsive to substantial gassing incident to overcharging thereof when said apparatus is placed in controlling relationship to a charging circuit supplying said charging current to the cell means, a catalytic device disposed in use adjacent the cell to facilitate the recombination into water of gaseous hydrogen and oxygen formed by substantial electrolysis of the aqueous electrolyte during the charging cycle of the cell, said catalytic device being responsive to a rise in temperature in response to an increase in the rate of hydrogen and oxygen recombination, and means adjacent to and in heat exchange relation with said catalytic device for detecting a change in the temperature of the catalytic device and responding to said temperature change to control the charging current in the charging circuit.

2. Apparatus as defined in claim 1 wherein the means adjacent to and in heat exchange relation with said catalytic device is a resistor with a high negative temperature coefficient of resistance.

3. Apparatus as defined in claim 1 wherein the means adjacent to and in heat exchange relation with said catalytic device comprises a thermocouple and an amplifier for the current flowing therethrough.

4. Apparatus for regulating the charging rate of a storage battery in response to the gas generated therein and attachable to at least one cell thereof to complete a charging circuit comprising
   (a) a catalyst device adapted to facilitate an exothermic recombination reaction into water of gaseous hydrogen and oxygen formed by electrolysis of the aqueous electrolyte during only the latter part of the charging cycle of the battery, said catalyst device being thermally responsive to said exothermic recombination reaction,
   (b) a charging circuit including a current source for supplying charging current to said battery,
   (c) a control circuit operatively connected to, and able to control the current in the charging circuit, said control circuit comprising resistance means responsive to the temperature of the catalyst device, and in heat exchange relation thereto whereby said control circuit controls the current in the charging circuit in response to changes in the temperature of the catalyst device in the control circuit.

5. Apparatus as defined in claim 4 wherein the said resistance means responsive to the temperature of the catalytic device comprises a resistor, the resistance of which is inversely proportional to its temperature.

6. Apparatus as defined in claim 4 wherein the resistance means responsive to the temperature of the catalytic device comprises a resistor with a negative temperature coefficient of resistance, and wherein relatively more current is allowed to flow in the charging circuit at a relatively lower catalyst temperature, and the current flow in the charging circuit is reduced to a lower value, including substantially zero, at a relatively higher catalyst temperature.

7. Apparatus as defined in claim 4 wherein the resistance means responsive to the temperature of the catalyst device comprises a resistor and a transistor, said resistor being disposed across the emitter-base circuit of said transistor to facilitate control of the emitter-collector circuit thereof so that low catalyst temperature and high resistance of the said resistor will cause a relatively high current in the said transistor emitter-collector circuit and which current will saturate a transductor and reduce the impedance in the alternating current supply portion of a charging circuit from which circuit a direct current is supplied to charge the battery, thereby providing relatively more charging current at a relatively lower catalyst temperature.

8. Apparatus as defined in claim 4 wherein the resistance means in the control circuit comprises a thermocouple and means for amplifying the current flowing in the thermocouple and utilizing said amplified current to control the charging current in response to variations in the temperature of said catalyst.

9. Apparatus for controlling a charging current to be applied to wet electrical storage cell means and preventing the charging rate from substantially exceeding a rate which causes substantial and harmful electrolysis of the aqueous electrolyte at any ambient temperature at which the cell is operable, comprising, in combination with said storage cell means to be charged, a catalytic device adapted to be disposed in use adjacent said storage cell means, and adapted to catalyze the recombination into water of hydrogen and oxygen formed by substantial electrolysis of the said electrolyte, said catalyst being thermally responsive to the presence of said gases being catalytically recombined, means adjacent to and in heat exchange relationship within said catalytic device for detecting and responding to the temperature of said catalytic device, means for supplying a controlling current to the said detecting and responding means, and means for regulating the amount of charging current supplied to the storage cell means at any time in a proportion to the controlling current flowing in the control circuit comprising the said detecting and responding means.

10. Apparatus as defined in claim 9 wherein the said storage cell means comprise at least one battery of at least two cells.

References Cited in the file of this patent

UNITED STATES PATENTS

| | | |
|---|---|---|
| 2,529,038 | Medlar et al. | Nov. 7, 1950 |
| 2,578,027 | Tichenor | Dec. 11, 1951 |
| 2,687,449 | Gulick et al. | Aug. 24, 1954 |
| 2,899,635 | Yardney | Aug. 11, 1959 |
| 2,967,988 | Seright | Jan. 10, 1961 |
| 2,978,633 | Medlar | Apr. 4, 1961 |
| 2,991,160 | Claussen | July 4, 1961 |